INVENTORS
JOHN H. MacNEILL &
JAMES E. BELLINGER, JR.

BY Hurvitz & Rose

ATTORNEYS

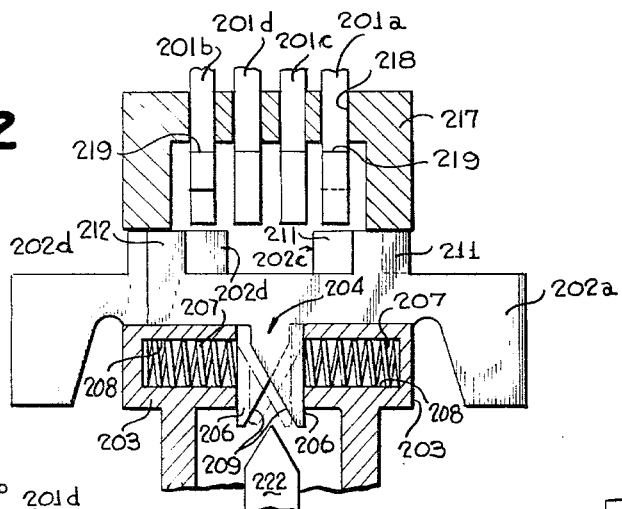
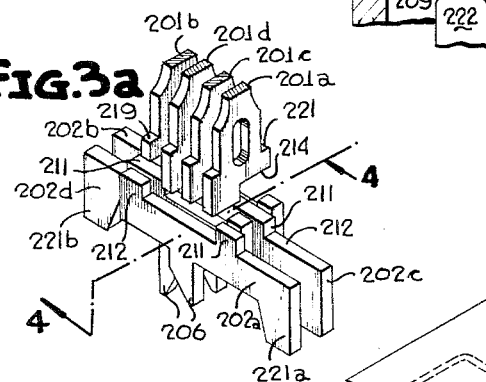
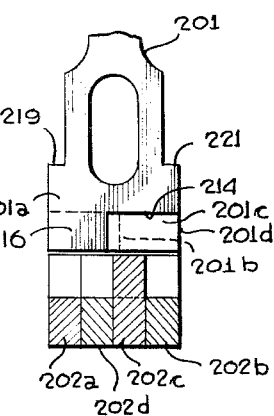
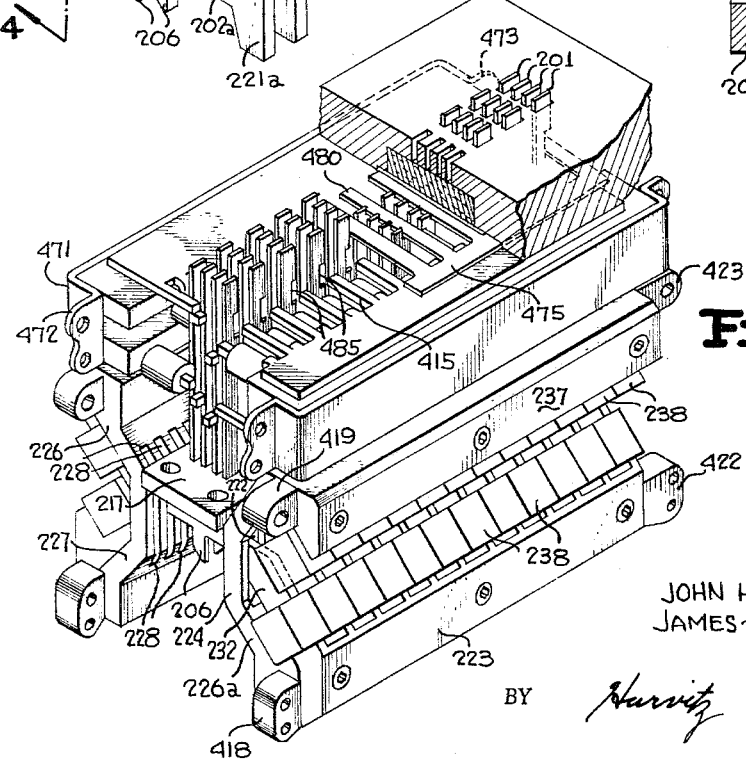

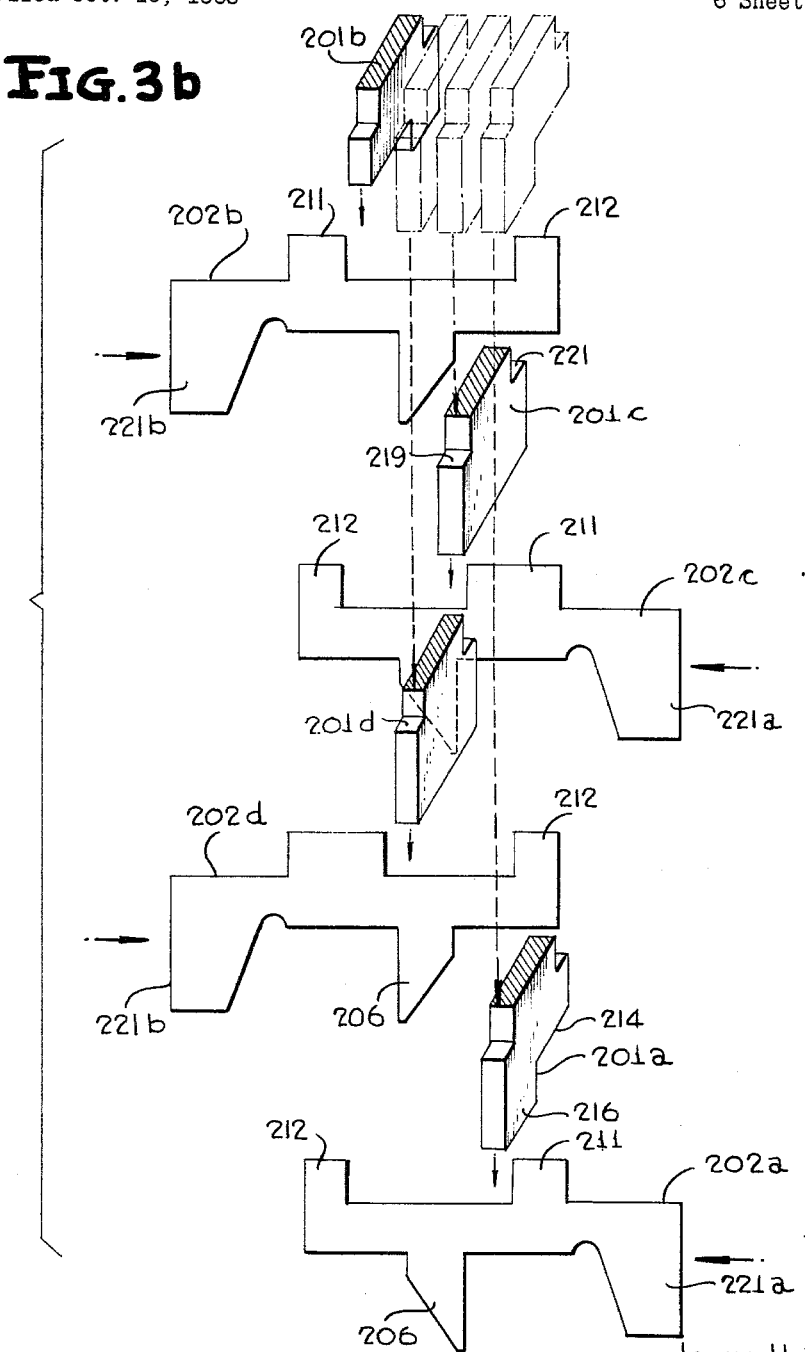

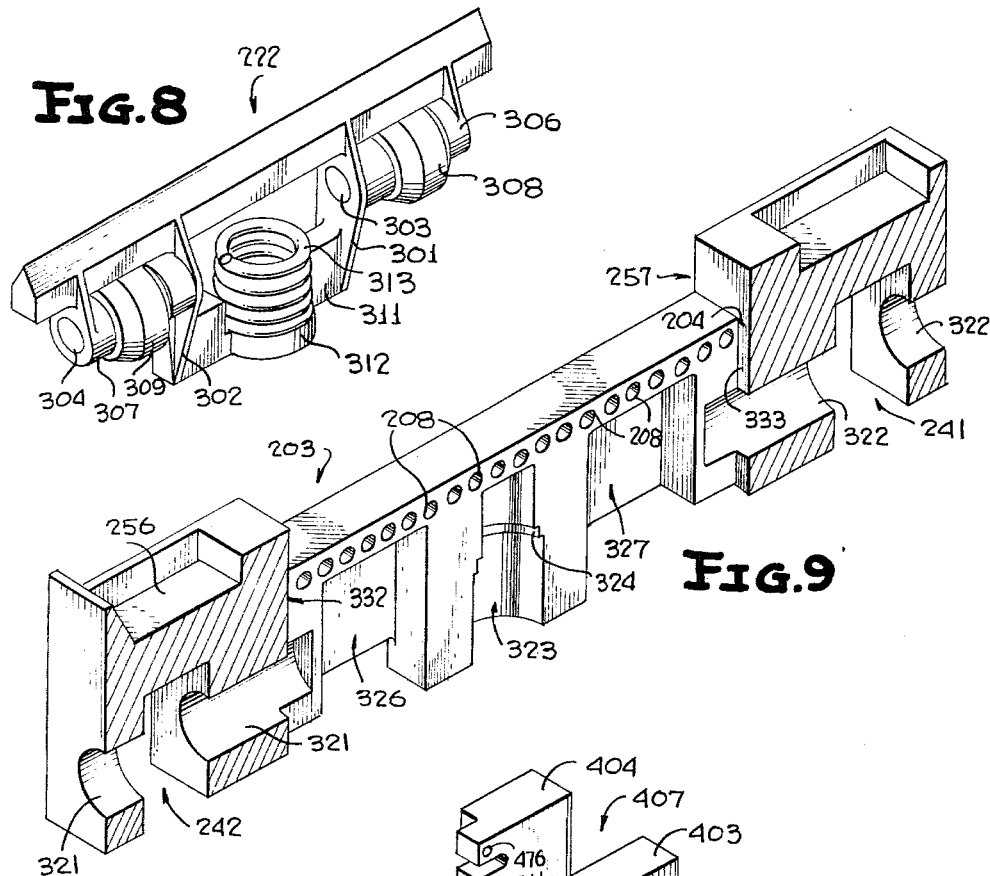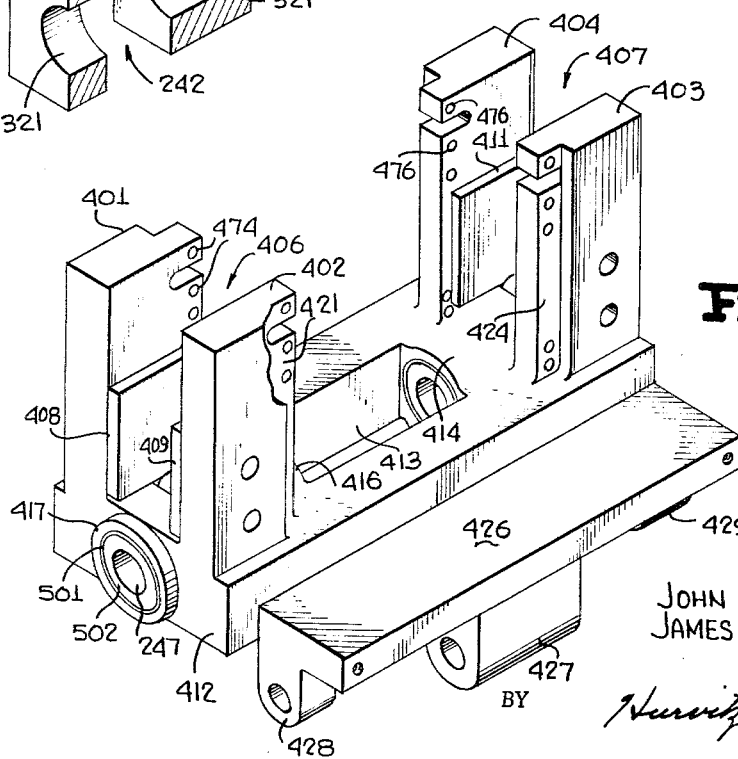

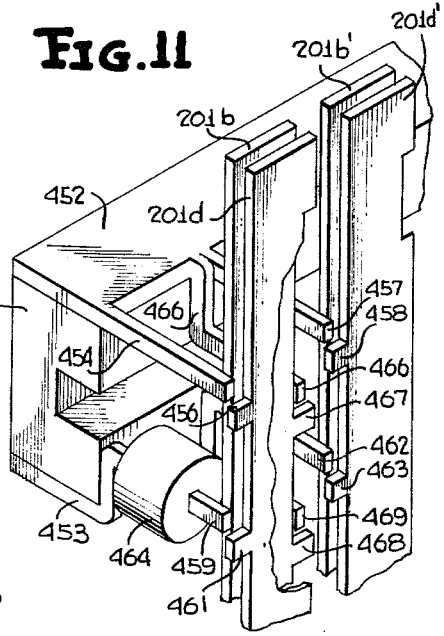
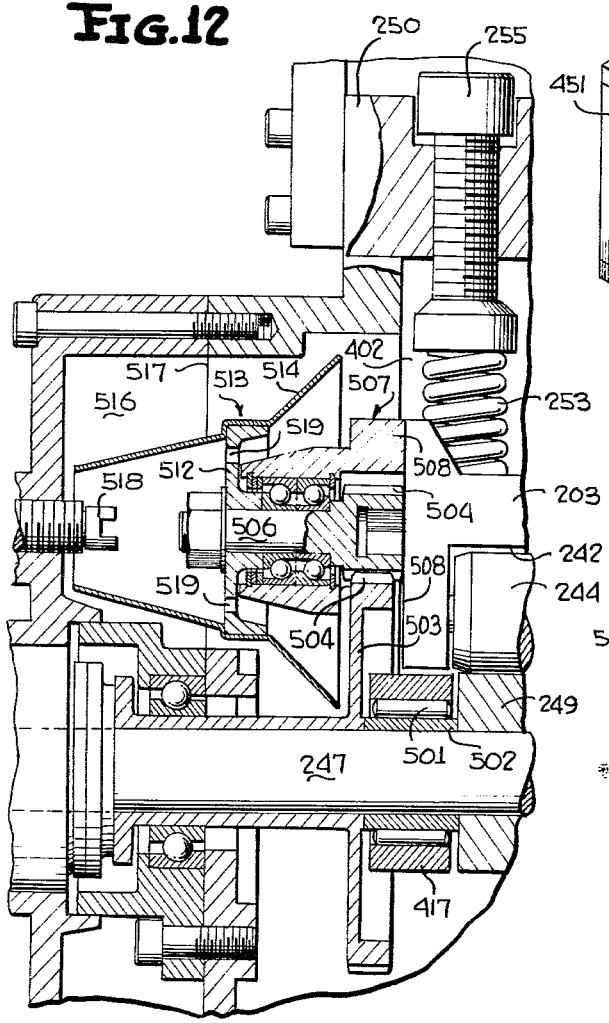
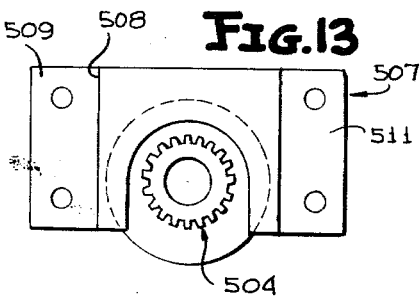

United States Patent Office 3,232,525
Patented Feb. 1, 1966

3,232,525
HIGH SPEED CARD PUNCH MECHANISM
John H. MacNeill, Indialantic, and James E. Bellinger, Jr.,
Eau Gallie, Fla., assignors to Soroban Engineering,
Inc., Melbourne, Fla., a corporation of Florida
Filed Oct. 15, 1963, Ser. No. 316,298
31 Claims. (Cl. 234—33)

The present invention relates to a card punching apparatus, or particularly to a high speed card punch apparatus capable of fully perforating at least 720 columns per second in standard data cards.

It is an object of the present invention to provide a high speed card punch which simultaneously perforates any selected array of information areas in several columns of the card where the several columns are designated by the symbol $x$, so that up to $xn$ apertures may be punched into the card during a single punch cycle where "$n$" is the number of information areas per column.

It is another object of the present invention to provide a high speed card punch providing for interposer selection of punch pins to be actuated and employing a reciprocating bail, which provides full support for the interposers.

It is still another object of the present invention to provide a high speed card punch employing selectively actuable interposer mechanisms for selecting an array of $xn$ different punch pins arranged in an "$x$" column by "$n$" row font.

It is another object of the present invention to provide a high speed card punch employing reciprocating punch pins and to further provide an interposer arrangement for selecting punch pins in accordance with input information, wherein restoration of selected interposers to their unactuated position is affected by a restorer bail disposed internally of the main bail and reciprocable with respect thereto.

It is another object of the invention to provide a high speed card punch employing selectively actuable interposers to select various punch pins to be driven to a punching position, wherein positive mechanical return of the interposers to their unactuated position is affected, and wherein the interposers are held in their unactuated position by selectively energizable electromagnets.

Another object of the present invention is to provide a high speed card punch having a main bail for driving a plurality of selected punch pins into punching position and a restorer bail for driving selected interposers to their unactuated position, in which apparatus separate counterbalancing is provided for the main bail and the restorer bail so as to eliminate undue vibration.

It is still another object of this invention to provide a high speed card punch in which all mechanisms but one are driven directly from cams located on a main drive shaft.

It is yet another object of this present invention to provide a high speed card punch employing a single drive shaft having a pair of main bail drive cams and a pair of interposer restorer bail cams in which the configurations of the cams are such that a counterbalance for the main bail is driven directly from the restorer bail cams and counterbalances for the restorer bail are driven from the main bail cams.

It is yet another object of the present invention to provide a high speed card punch in which all wear surfaces are bathed in an atomized oil spray.

It is still another object of the present invention to provide a high speed card punch for selectively actuating a configuration of $xn$ different punch pins arranged in $x$ columns of "$n$" rows each, wherein separate verification of the actuation of each punch pin is provided by relatively simple structures.

It is still another object of the present invention to provide a high speed card punch for selectively actuating any array of $xn$ different punch pins arranged in $x$ rows of "$n$" columns each, and in which all punch pins are substantially identical, and in which only two different types of interposer structures are required.

It is yet another object of the present invention to provide a high speed card punch incorporating a punch verification mechanism which is of the variable reluctance type and in which two air gaps are closed whenever a single pin is actuated, thereby to provide a large rate of change of flux density in the variable reluctance circuit and to provide a relatively large output signal, even though the coil structures employed in the variable reluctance circuitry are quite small.

The above and still further objects, features and advantages of the present invention will become apparent upon consideration of the following detailed description of one specific embodiment thereof, especially when taken in conjunction with the accompanying drawings, wherein:

FIGURE 2 is a partial showing in elevation of the punch pin and interposer arrangement of the present invention;

FIGURE 3a is a perspective view, and FIGURE 3b is an exploded perspective view of the punch pin and interposer arrangement;

FIGURE 4 is a side view of the punch pin and interposer arrangement;

FIGURE 5 is a perspective view illustrating the interposer selection magnets and punch pin sensing circuits of the present invention;

FIGURE 8 is a perspective view of the interposer restorer bail;

FIGURE 9 is a perspective sectional view illustrating one-half of the punch bail of the present invention;

FIGURE 10 is a perspective view of the main support mechanism of the punch;

FIGURE 11 is a perspective view illustrating the variable reluctance mechanisms employed to sense operation of the punch pins;

FIGURE 12 is a cross-sectional view in elevation of the oil pump arrangement employed; and FIGURE 13 is a front view of the oil pump drive shaft and gear arrangement.

Figure 1:
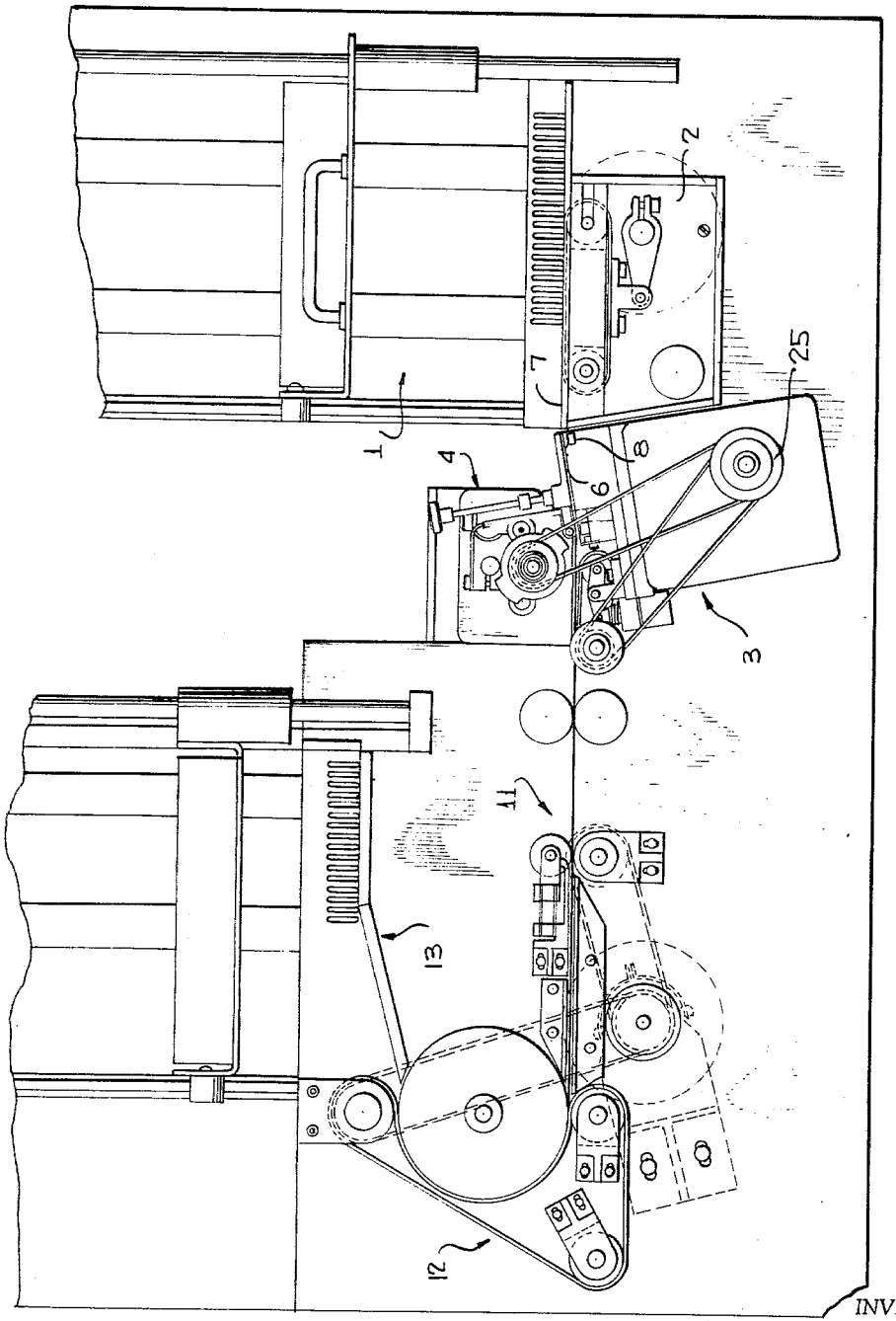
FIGURE 1 is a front elevation of a system in which the mechanism of the present invention may be employed.

Referring now specifically to FIGURE 1 of the accompanying drawings, there is illustrated a complete arrangement for picking a card from a supply bin, feeding it to the high-speed card punch of the present invention, intermittently transporting the card through the punch to present successive portions of the card to the punch mechanism during each punching cycle and, when all areas of the card have been presented to the punch, or all areas of the card which are to be perforated have been perforated, ejecting the card from the punch and delivering it to a card stacker bin.

In operation, the bottom-most card in a stack of cards in the card supply bin, generally designated by the reference numeral 1, is withdrawn from the stack by means of a selectively actuatable picker mechanism 2, and presented to the high-speed card punch of the present invention, generally designated by the reference numeral 3. Disposed above the punch 3 is a feed mechanism, generally designated by the reference numeral 4, employed to selectively and intermittently advance the card through the punch mechanism so that, during each cycle of operation of the punch 3, a different region of the card is presented to the punch pins of the punch for perforation thereby. The nature of the intermittent card feed mechanism 4, imposes certain requirements on the interrelationship between the various other elements of the system. As more fully described in co-pending U.S. patent application Serial No. 316,305, filed on concurrent date in the name of MacNeill and Bellinger for High Speed Card Feed Mechanism, during each feed operation, a card is clamped to two feed arms arranged at each edge of the card, and the arms are swung through a fixed angle, thereby causing the card to be moved through a curve in the region of the feed arms. The feed arms therefore change the plane of movement of the card. In order for the card to come out of the punch and feed mechanisms 3 and 4, respectively, in a generally horizontal plane, the card is initially turned through an initial fixed angle upon delivery from the picker mechanism 2 to the card punch 3, said initial fixed angle being equal to the fixed angle through which it is deflected during transport. The card punch 3 provides an upper guide surface 6, which lies at the downward fixed angle relative to an upper surface 7 of the base plate of the picker mechanism. Consequently, the card is turned upward through the same angle at this point during transport by feed mechanism 4.

The entire mechanism is required to operate at high speeds and this requirement imposes certain design limits on the various mechanisms. More particularly, the card feed mechanism 4, having relatively little time available between each transport operation, must completely release the card during each punch cycle so that the feed mechanism may be returned to its initial position, clamp the card in this location, and then transport the card by swinging its arms through the described fixed arc. Since the card is released by the feed mechanism 4 during the punch cycle, provision must be made for retaining the card in that position to which it has been moved during the previous feed cycle. This is accomplished by providing a plurality of leaf spring fingers, only one of which is illustrated in FIGURE 1, and this being designated by the reference number 8. The card, upon being ejected from the picker mechanism 2, passes between the upper guide surface 6 of the punch and the spring fingers 8. The spring fingers 8 maintain a friction load on the card and therefore, the picker mechanism 2 must be such as to be able to deliver a card from the card supply bin 1 through this load at a relatively high speed. In the specific environment in which the apparatus is illustrated, the card must be delivered to the punch in no more than 18 milliseconds through approximately a one-half pound load as exerted thereon by the spring fingers 8. The mechanism by which card picking and feeding to this punch is described fully in copending patent application Serial No. 316,410 filed on concurrent date by Halbert for Card Picker Mechanism.

The punch 3 is provided with a quick-eject mechanism generally designated by the reference number 9 which, when it is desired to extract a card from the punch mechanism, is actuated and withdraws the card to the left, as viewed in FIGURE 1, at a very rapid rate. The quick-eject mechanism 9 although physically secured to the punch housing is actually integrated with the card feed mechanism 4 and is described in the aforesaid co-pending application relating thereto. The card passes through a series of rollers and guide members, generally designated by the reference number 11, and through a stacker mechanism, generally designated by the reference numeral 12, to a card stacker bin generally designated by the reference numeral 13.

If a standard 12 row by 80 column IBM card is to be processed by the system, the entire mechanism is designed to handle four hundred cards per minute. About 90 percent of this time is employed to process a card through the punch 3 and feed mechanism 4 when all columns of the card are to receive information. The remaining 10 percent of the interval is utilized for card feed from the picker mechanism and card extraction and stacking.

The arrangement illustrated in FIGURE 1, considering the apparatus as lying in the plane of the page of FIGURE 1, is inclined at about 15 degrees with the horizontal about the lower edge of the page. However, for ease of description, in the subsequent figures, the apparatus is considered to be arranged vertically.

Referring specifically to FIGURES 2 through 6, the mechanism for selecting and actuating punch pins is illustrated. Punch pins which are generally designated by the reference numerals 201 are arranged for purposes of description only in four columns of 12 punches each. Interposers 202 are arranged under, as indicated in FIGURES 2 through 6, the punch pins 201, there being one interposer for each of the punch pins. In the embodiment illustrated, there are 48 punch pins 201 accompanied by 48 interposers 202.

Referring specifically to FIGURES 3a and 3b of the accompanying drawings, the interposers are staggered with the first interposer extending to the right of a punch bail 203 as in FIGURE 2, the next interposer extending to the left of the bail 203, with this alternate arrangement being followed throughout the 48 interposer array. A bottom surface of each of the interposers, as viewed in FIGURE 2, rests on the upper surface of the punch bail 203, having in the region of the interposers, a center channel generally designated by the reference numeral 204. Each interposer has a downwardly extending finger 206 positioned in the channel 204. The interposers 202, which extend outwardly to the right are adapted to be urged towards the left when selection of a punch pin 201 is to be made, the force for this leftward movement being provided by a spring 207 disposed in individual recesses 208 in the bail 203. There is one spring 207, for each interposer and one recess 208 for each of the springs. The springs 207 engage the downwardly extending fingers 206, of the interposers, with the opposite face of the finger 206 being sloped as indicated by the reference numeral 209, for purposes to be explained subsequently.

Each interposer is provided with two upwardly extending projections 211 and 212, the upward extensions being viewed in FIGURES 2 and 3a and 3b. The upward extensions 212 are of fixed width for all interposers and the extensions 211 are of different widths. The widths of the upward extensions 211 alternate from wide to narrow such that narrow sections 211 are employed for coupling of thrust to the outer punch pins 201 while wider extensions 211 of the interposers are employed with the centrally located punch pins 201. The extensions 212 are employed to provide guide surfaces on bail 203 and on an upper bail member 207 so as to maintain the interposers upright. In the figures, the numerals 201a, 201b, 201c and 201d are applied to the various punch pins of the group of four pins being discussed. The corresponding interposers carry reference numerals 202a, 202b, 202c and 202d. Each upward extension 211 is of such a width that when an interposer is moved into its actuated position, for instance to the left as viewed in FIGURE 2 for the interposer 202a, the extension 211 is positioned under its associated punch pin, the punch pin 201a in the example. Upon upward movement of the main punch bail 203, the projection 211, of the interposer 202a, engages the under surface of the punch pin 201a, and moves it upwardly with the bail. In this manner, an aperture is punched into a card.

Referring specifically to FIGURE 3a, the left punch pin 201b is controlled by the interposer 202b, this interposer being the fourth interposer in the line; that is, the second interposer having a leftward extension. In order to select the two innermost punch pins 201c and 201d the interposers 202c and 202d are employed. The upward projections 211 of these interposers are wider than the upper projections 211 of interposers 202a and 202b and as with the wider extensions 211 on 202c and 202d, each extends to a point just short of its associated punch pin.

Upon inward movement of these interposers, the upward extensions 211 become disposed under their associated punch pins 201, so that when the bail 203 moves upwardly the pins are raised. The punch pins 201a and 201b have their bottom surfaces each formed with a notch 214 so that the punch pins are not affected by any interposer except that assigned to a particular punch pin 201. In FIGURES 3b and 4, the above arrangement provides a downwardly extending portion 216 on the bottom of punch pins 201a and 201b adapted to being engaged by the interposers 202a and 202b but not by interposers associated with punch pins 201c or 201d.

Referring to FIGURES 3a and 3b, it will be noted that the portions 216 of the first punch pin 201a is located at the front of the pin and is intended to be selected by the first interposer 202a in the array. The fourth punch pin 201b has its downward extension 216 located toward the back in FIGURES 3a and 3b and is adapted to be selected by the fourth interposer 202b, in the array. Neither of the central punch pins 201c and 201d require a downward extension since no interposer, in the embodiment illustrated, must extend beyond 201c or 201d to reach a more isolated punch pin, although if such were necessary the bottoms of these pins would also be appropriately recessed. In the embodiment illustrated here, the pattern of these four pins and interposers is repeated twelve times to provide for control of the 48 punch pins of the apparatus.

The apparatus is provided with a U shaped upper bail member 217 secured to the main bail 203, and movable therewith. When rectangular holes are to be punched, as illustrated in this embodiment, the member 217 is provided with four rows of 12 columns of rectangular apertures 218 each adapted to receive a different punch pin. Each pin is provided with inwardly directed shoulders 219 and 221 at opposite ends of the pin, these shoulders being disposed immediately below, as viewed in FIGURE 2, the upper bail member 217. When a punch pin 201 has been moved upwardly into punching position, the pin would normally tend to remain in the card, due to frictional engagement between the pin and the card. However, upon downward movement of the main bail, and therefore downward movement of the U shaped member 217, the under surface of the latter's cross member engages the shoulders 219 and 221 of the pins 201 and moves the pins downwardly and out of the card so as to affect a punch pin return operation.

As previously indicated, punch pins are selected by interposer movement at the beginning of each punch cycle; this implying that previously selected interposers must be returned to their unactuated positions at the end of each punch cycle. In order to restore the interposers to their unactuated positions, there is provided a vertically reciprocable restorer bail 222, with a V-shaped upper surface which by proper timing of its movements relative to the punch bail 203 provides interposer return. When interposers have been actuated, and punching is about to commence, the fingers 206 assume the dotted line positions, as illustrated in FIGURE 2. The punch bail 203 now moves upwardly and the restorer bail is also moved upwardly at this time so that the spacing between the bail 222 and fingers 206 of the interposers 202 is maintained. At the end of the punch cycle, the punch bail 203 is moved downwardly while the bail 222 is held in its upward position. Consequently the inverted V-shaped upper part of bail 22 enters the space between the fingers 106, engages the sloping surfaces 209 and moves interposers respectively to the left and right, in order to force them back into the full line position illustrated in FIGURE 2. The interposers are held in their unactuated positions by electro-magnets which are energized when interposers are to be held out and punching is not to be performed. When an interposer is to be inserted, its associated electromagnet is de-energized the interposer is urged inwardly by its associated spring 207. In actual practice, the interposers are released just after interposer reset while the reset bail 222 is moving out of driving engagement with the interposers. In this way bail 222 controls the acceleration and velocity of the inwardly moving interposers.

Figure 6:
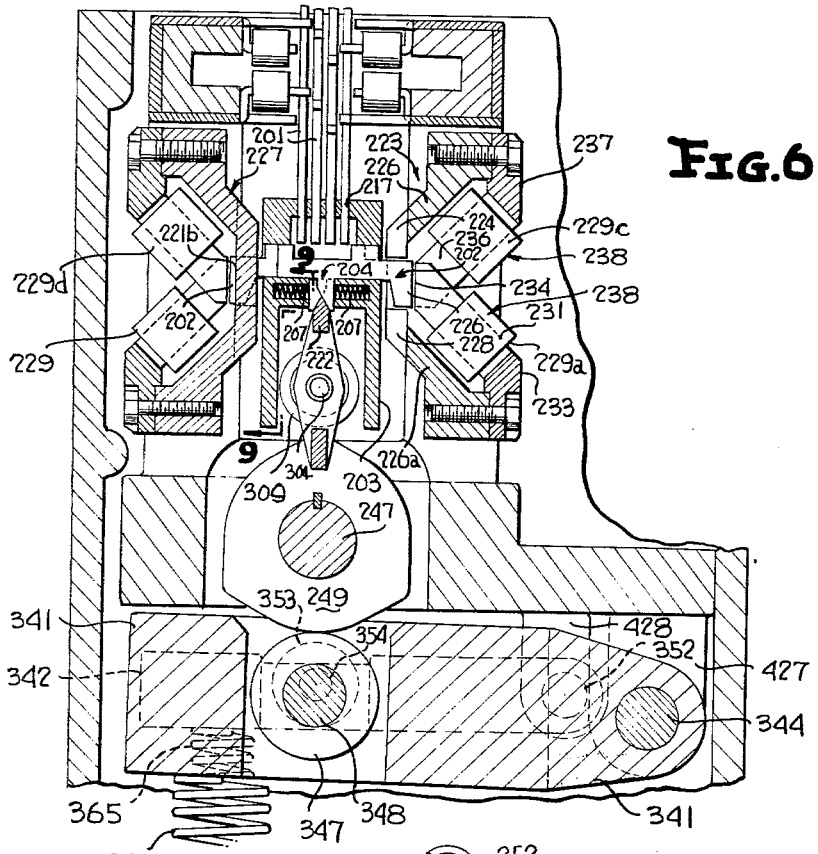
FIGURE 6 is a cross-sectional side view of the apparatus of the present invention.

Referring now specifically to FIGURES 5 and 6, there are illustarted two different views of the interposer selection and punch pin actuating mechanism. At the moment only the interposer selection apparatus is described. Each interposer has a generally downward extending L shaped section at one of its ends in FIGURE 2, providing the legs 221a on the right end of interposers 202a and 202c and legs 221b on the left ends of interposers 202b and 202d. Each of the right extensions 221a is supported in a slot 222 formed in a right hand interposer support member 223 and staggered from a left hand slot 228 in a left support member 227. The support members 223 and 227 are in the shape of flat bottom V sections, the member 223 having a vertical section 224, as viewed in FIGURE 6, and arm 226 which extends upwardly and to the right and an arm 226a which extends downwardly and to the right. This member is suitable supported, as indicated subsequently, and every slot 222 has a portion 221a of an interposer 202 supported therein in and extending therethrough to the right. The member 227 is arranged on the left side of the apparatus and is a mirror image of member 224. Slots 228 are formed in the member 227 and alternate in position with slots 222 of the member 224. The slots 228 have positioned therein and extending therethrough the extensions 221b of the alternate interposers 202. The alternate slots formed in the member 227 are staggered with respect to the slots 222 in 223 since only the L shaped extensions 211 pass through these slots. Thus only the slot in 227 is visible in the section of FIGURE 6. The interposers 202 are supported in, guided by, and carried upwardly with the punch bail 203 and its cap 217. The L sections 221 are passed through the slots 222 and 228 so that they may serve as armatures and be attracted by magnets 229, as will be explained later. The slots 222 and 228 are of sufficient height to permit the interposers to rise through the full travel of the main bail 203. The interposers are illustrated in FIGURES 5 and 6 in their unselected positions.

In order to maintain the interposers 202 in their unselected positions, against the force of the springs 207, there are provided a series of magnets 229a and 229c on the right side and 229b and 229d on the left side of the apparatus. Poles 231 for the magnets 229a are formed as individual fingers 232, which extend upwardly from a solid base member 233 formed of high magnetic permeability material. The base member 233 is secured to the bottom leg 226a of the interposer support member 224 as illustrated in FIGURE 6. The slotted member 223 is also formed from a magnetic material to provide a magnetic return path for the magnetic circuit.

Each of the fingers 232 terminates in a vertical face 234 immediately adjacent the vertical face of the right hand extension 221a of every fourth interposer 202. Interleaved with the fingers 232 are a further set of fingers 236, which extend downwardly and to the left from a bar 237 of high magnetic permeability material. The fingers 236 are interleaved with the fingers of 232 and terminate opposite the extension 221a of every fourth interposer 202, so that fingers 232 and 236 are alternately disposed opposite every other interposer 202.

A separate electric coil 238 is disposed about each of the fingers 232 and 236. When a coil is energized, for instance, the coil associated with a finger 232, a magnetic flux path is established through the finger 232, the end 221a of the associated interposer 202a, the slotted interposer guide member 224, and back to the bar 233 from which the fingers 232 extend. The corresponding path for the upper magnetic structure is through a finger 236, end member 221a of the associated interposer 202, the upper arm 226 of the slotted member 223 and the base 237 of the magnetic finger arrangement. The force of the magnetic circuit on the interposers 202 is sufficient to retain the interposers in their unactuated position against the force of the spring 207. It will be noted that the force required from the electro-magnetic circuits is only sufficient to maintain the interposers in their unactuated position, return of the interposers to this position being affected by the return bail 222. The magnetic circuit arrangement on the left side of the apparatus is identical with that described on the right side except that it is a mirror image thereof and in staggered relationship so that the respective magnet poles will be in alignment with their respective interposer armatures 221. Each of the fingers of the lower and upper magnetic circuit 229b and 229d is disposed opposite alternate ends 221b of their associated interposers 202, the right and left side arangements being interleaved or staggered throughout so that a magnetic circuit is provided for each of the interposers.

The arrangement described above is employed to permit all of the magnetic control circuits to be arranged within the space permitted, the spacing between the variout members being dictated by the spacing between the information areas on the punched card.

Figure 7:
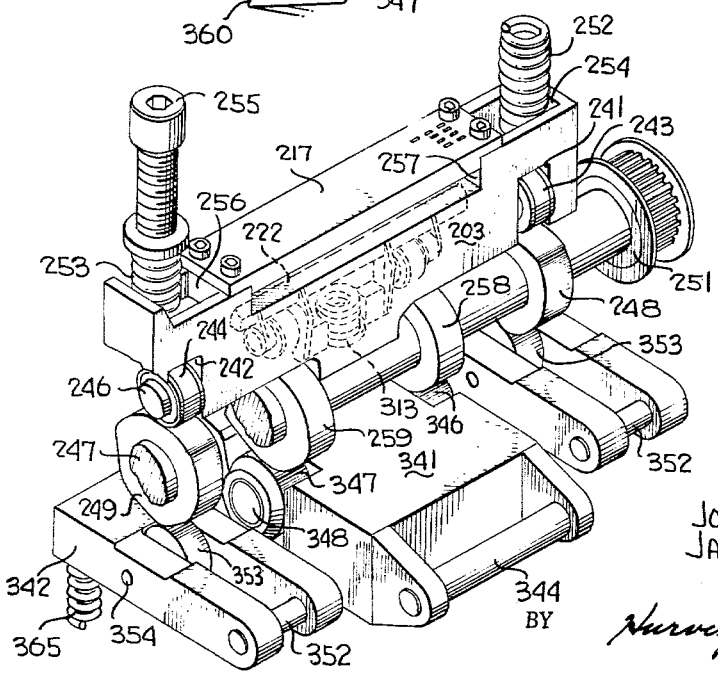
FIGURE 7 is a perspective view of the punch and interposer restorer bails and counter weights.

Referring now specifically to FIGURE 7 of the accompanying drawings, there is illustrated the apparatus for driving the main punch bail 203. The bail 203, as indicated in the prior figures is a hollow channel member in its central portion in order to accept the return interposer structure. At the two ends of the main bail, however, solid members are provided; the solid members having vertical channels 241 and 242 formed therein. These channels are perpendicular to the hollow central channel formed in the bail and are adapted to receive cam follower rollers 243 and 244 respectively. The cam follower rollers 243 and 244 are supported on shafts, such as the shaft 246, illustrated at the cut away section at the left side of FIGURE 7. Disposed below the bail 203 is a main drive shaft 247, which supplies all of the rotational power to the apparatus.

Disposed on generally opposite ends of the shaft are main drive cams 248 and 249 adapted to engage the cam follower rollers 243 and 244. The cams 248 and 249 are three-lobed cams with the centers of each of the three identical lobes being disposed at 120 degrees. Power is supplied to the shaft 247 directly from the main drive motor through a friction clutch 251, which is diagrammatically illustrated since it forms no part of the present invention Since three lobe cams are employed, three cycles of operation are provided for each revolution of the main shaft 247 and the main bail rises and falls three times for each revolution of the shaft. The bail cam follower rollers 243 and 244 are maintained in contact with the three lobe cams 248 and 249 by means of compression springs 252 and 253, disposed at the right and left sides of the apparatus respectively, as viewed in FIGURE 7. The springs 252 and 253 are received in recessed portions 254 and 256 formed in the upper surface at opposite ends of the bail. Screws 255 which are threaded into a portion of the punch's main plate and guide block 250 is pictured in FIGURE 12 so as to tension springs 252 and 253 thereby loading the bail's cam followers 243 and 244 into continuous engagement with cams 248 and 249.

The central section of the upper surface of the bail is recessed to provide a horizontally extending recess 257, which lies in a substantially vertical plane in the apparatus when in the position in which it is actually employed. The upper guide member 217 (see FIGURE 2) is bolted to the upper surface of the bail 203, its downwardly extending legs, as viewed in FIGURE 2, defining the upper limits of the slot 257. The interposers 202 extend through the slot 257 into the region under the punch pins.

Also carried on the shaft 247 are two interposer restorer bail cams 258 and 259. These cams are also three-lobed cams of similar contour to the punch bail cam and again with the center lines of the lobes separated 120 degrees from one another. The cams 258 and 259 are set on the shaft 247 such that the lobes of these cams are aligned with one another and are disposed at 60 degrees relative to the lobes on the main bail cams 248 and 249.

Referring now specifically to FIGURE 8 of the accompanying drawings, there is illustrated in greater detail, the interposer restorer bail 222 and its support mechanism. The restorer bail 222 is carried by a pair of downwardly extending arms 301 and 302. The arms 301 and 302 each support one end of cam roller shafts 303 and 304, respectively, the shafts being supported at their outer ends by arms 306 and 307 which also extend downwardly from the bail 222. The shaft 303 carries a first cam follower roller 308 while the shaft 304 carries a second cam follower roller 309. These rollers are adapted to ride on the cams 258 and 259, respectively. Supported between the arms 301 and 302 is a rectangular member 311 having an enlarged circular section 312 formed concentric with the vertical center, as viewed in FIGURE 8, of the bail mechanism. The circular section 312 is adapted to support a compression spring 313, which engages an upper surface a shoulder formed in the main punch bail. The spring 313 serves to bias the restorer bail downwardly, as illustrated in FIGURE 8, so as to maintain the cam rollers 308 and 309 in engagement with the cams 258 and 259. The cams therefore cause the restorer bail mechanism to rise against the compressional force of the spring 313.

Referring now specifically to FIGURE 9 of the accompanying drawings, there is illustrated a cross sectional view of the main bail 203 taken along section lines 9—9 of FIGURE 6. FIGURE 9 therefore shows approximately ½ of the bail, the other half being a mirror image thereof. The two ends of the bail are recessed as previously indicated to provide channels 241 and 242, which receive the main cam follower rollers 243 and 244. Circular channels 321 which extend parallel to the upper surface of the bail are provided for the shaft 246 and a corresponding set of channels 322 are provided at the other end of the bail to receive the shaft for the roller 243. Centrally of the bail 203 there is provided a circular passage or bore 323 terminating in a shoulder 324. Recess 323 receives the compression spring 313 employed as the interposer bail restorer spring. The spring seats against the annular shoulder 324 to provide an upper restraining surface therefore. The bail 203 is also recessed at locations designated by reference numerals 326 and 327 on opposite sides of the circular passage or bore 323. The recesses 326 and 327 accept the cam follower rollers 308 and 309 of the interposer restorer bail and the associated support arm mechanisms As previously indicated the upper surface of the bail is provided with a recess 257 which with the upper member 217 of the bail provides the gap through which the interposers pass. It should be noted that in this region, the side wall of the bail 203 is recessed to provide one-half of the channel 204 for the downward extensions or fingers 206 of the interposers. The end walls 332 and 333 provided by recessing the side walls of the main bail 203, provide end thrust supports for the upper cross member of the interposer return bail structure 222.

Referring again to FIGURES 6 and 7 of the accompanying drawings, there is illustrated, the counterweight mechanisms employed in the apparatus of the present invention. A centrally located counter weight 341 is provided for the punch pin and bail mechanism, while two counter weights 342 and 343 are provided for the restorer bail mechanism. The main counter weight 341 is pivoted about a shaft 344 at one end, and adjacent its other end carries in recessed portions of the counter weight, two cam follower rollers 346 and 347 mounted on a shaft 348. The cam follower rollers 346 and 347 are disposed under and in engagement with the interposer restorer bail cams 258 and 259, respectively and are biased into contact with said cams by spring 360 of FIGURE 6 which spring bears against the punch's main housing in a conventional fashion and as a result is not shown. It will be remembered that the cams 258 and 259 are three-lobed cams, as are the cams 248 and 249, which are employed to drive the main push bail. The lobes on the two sets of cams when considering a single cycle of operation, are rotated 60 degrees relative to one another and thus, a corresponding lobe on each of the restorer bail cams 258 and 259, is at all times disposed at 180 degrees with respect to a lobe on each of the main bail cams 248 and 249. Thus, when the main bail is being moved upwardly under control of the cams 248 and 249, the main bail counter weight is being driven downwardly by the restorer cams 258 and 259. The radius of gyration of the two portions of the counter weight 341 on the opposite sides of the vertical center line 351 of the main bail 203, as viewed in FIGURE 6, are symmetrical relative thereto so as to minimize side thrust resulting from the fact the the counter weight 341 rotates about the axis 344, while the main bail 203 has a vertical translatory motion. Maintaining the radius of gyration symmetrical with respect with the center line 351, and making its radius of rotation large, the side thrust resulting from the counter weight is small and excellent counter balancing of the thrust of the main bail 203 is achieved.

The counter weights 342 and 343 for the interposer restorer bail, are identical in structure so that only the counter weight 342 is described. The counter weight 342 rotates about a shaft 352. The weight is bifurcated to provide a channel for a centrally located cam follower roller 353, which is supported on a shaft 354, extending between the two arms of the bifurcated member. The cam follower roller 353 rides on the bottom of the main bail cam 249, while the cam follower roller associated with the counter weight 343 rides on the bottom of the main bail cam 248. Springs 365 biases the counterbalances into following engagement with the main bail cams, said springs engaging the punch's housing in a conventional fashion and hence are not shown. The lobes on the main bail cams 248 and 249 are disposed 180 degrees out of phase each with a different lobe on the restorer bail cams 258 and 259. Thus, when the restorer bail mechanism 222 is moved upwardly under control of the cams 258 and 259, its counterweights 342 and 343 are moved downwardly under control of the main bail cams 248 and 249 thereby providing counter balancing of the thrust of the restorer bail. The counterweights are spring biased upwardly to maintain the cam followers in engagement with their respective cams.

Refering now specifically to FIGURE 10 of the accompanying drawings, there is illustrated the support structure for the main bail, the control magnets and the guides for the interposers. The support mechanism comprises four upstanding arms 401, 402, 403, and 404. These arms are disposed generally at the four corners of the support member and provide between the arms 401 and 402 on one hand and 403 and 404 on the other hand, two U shaped vertical channels 406 and 407, respectively. The channels 406 and 407 define vertical guides for the main bail and to provide accurately positioned and long lived bearing surfaces, inserts are provided in these channels. More particularly a hard metal bearing insert 408 is secured to the inner edge of the upstanding arm 401, and a second hard metal bearing plate 409 is secured to the inner surface of the arm 402. Similar bearing plates are provided on the two edges of the channel 407. Only one of these plates, plate 411, which is associated with the upstanding arm 404, being visible in FIGURE 10. Thus, the main bail 203 is guided at its two ends for vertical motion. End thrust of the bail is prevented at the right end of the apparatus, as illustrated in FIGURE 10, by merely applying an end plate. The end thrust support for the main bail at the left of FIGURE 10 will be described subsequently.

The arms 401, 402, 403, and 404 rise from the edges of a base plate 412. The base plate 412 is provided with a centrally located longitudinally extending channel 413 which is interrupted by bosses 414 and 416 employed to support the main shaft 247. The restorer bail cams 258 and 259 are located between the bosses 414 and 416. Further supports for the main shaft 247 are provided at the two ends of the structures, only the left one of which is illustrated in FIGURE 10. This end boss or support which is generally designated by the reference numeral 417, is spaced from the boss 416 and the main bail cam 249 is located therebetween. The main bail cam 248 is located between the end wall at the other end of the structure and the boss 414.

Mounting lugs or ears 418 and 419, see FIGURE 5, of the slotted interposer support member 223, are secured to a shoulder 421 formed in the vertical post 402, see FIGURE 10, while mounting lugs 422 and 423 formed on the opposite end of the member 224, are secured to a wall 424, formed as an extension from the vertical post 403. The slotted interposer support member 227, arranged on the left side of the apparatus, as viewed in FIGURE 5, is supported on shoulders or walls formed on posts 401 and 404, which shoulders correspond with shoulders 421 and 424, already described.

The base member 412 extends to the right to provide a horizontal platform 426, having a downwardly extending centrally located post 427, which supports the shaft 344 (see FIGURE 7) of the counterweight 341. Another arm or post 428 extends downwardly from the forward side of the platform or extension 426 to support the shaft 352 of the counter weight 342. Another arm 429 extends downwardly from the opposite sides of the platform 426 to support the shaft for the counterweight 343.

Referring now specifically to FIGURE 11 of the accompanying drawings, there is illustrated a greatly enlarged view of the verification mechanism for determining actuation of the selected punch pins. The entire arrangement is illustrated in FIGURE 5; only a small portion of the total structure on the left side being illustrated in FIGURE 11 in order to clarify the configurations employed. There is provided a U shaped permanent magnet 451, having comb-like structure 452 and 453, secured to its upper and lower surfaces, respectively. The U shaped magnet 451 is arranged on its side so that a pole of one polarity is in engagement with the comb 452 and the pole of the other polarity is in engagement with the comb 453. The comb structures 452 and 453 are fabricated from high magnetic permeability material so as to permit a concentration of flux in each of the structures. A first finger 454 extends directly out from the end of comb structure 452 and terminates just short of a projection 456 formed on the left or front surface of the punch pin 201d as viewed in FIGURE 11. When the pin is in its unactuated position, the projection 456 lies below, as viewed in FIGURE 11, the end of the finger 454. Upon actuation of the pin, the projection 456 is raised into alignment with the end of the finger 454, there being a very small air gap between the end of the finger and the projection.

A second straight finger 457 extends outwardly from the base of the comb 452, and also lies in the plane of the plate. This finger passes through the gap between punch pins 201b and 201b' and is disposed in line with, but above, a projection 458 on the second punch pin 201d' in the left central column of the pin array as defined in FIGURES 2 and 3. The spacing between the fingers 454 and 457 is equal to the designed spacing between punch pin centers. When the pin 201d' is actuated, the projection 458, is aligned with the front or right edge of the finger 457, thereby providing a very small air gap therebetween. The comb 453 is provided with a finger 459, which lies in the same vertical plane as the finger 454 of the comb structure 452. A double right angle bend is formed in the finger 459, so that the finger extends outwardly from the permanent magnet 451 at about the region in which the channels are formed down the center of the magnet.

The finger 459 terminates adjacent a second stud 461 formed on the punch pin 201d, the relative position between the finger 459 and projection 461 being substantially identical with the position between the finger 454 and the projection 456. Thus, when the punch pin 201d is raised, the projection 461 is disposed immediately adjacent the end face of the finger 459 of the comb structure 453.

A second finger 462, which is identical in configuration with the finger 459, also extends from the comb structure 453. The displacement between the fingers 459 and 462 is identical with the displacement between the fingers 454 and 457, so that the fingers 452 is vertically aligned with a second projection 463 formed on the punch pin 201d'. Thus, when the punch pin 201d' is raised, the projection 463 is aligned with the end face of the finger 462 with a very small air gap existing therebetween.

It can be seen that as a result of this arrangement, when a punch pin is unactuated, two relatively large air gaps exist between the punch pin 201d and the fingers 454 and 459 of the permanent magnet structure. The magnetic reluctance through the magnetic path is therefore, relatively high and the flux density in the path is low. However, when the punch pin 201d is raised, so that the projections 456 and 461 are disposed immediately adjacent the ends of their respective sensing fingers 451 and 459, the two air gaps are greatly reduced and the flux density in the magnetic circuit is increased to a considerable degree. A coil 464 is disposed around the arm 459, and in the overall structure a sensing coil is disposed about each of the bent fingers, no coils being disposed about the straight fingers, such as the finger 454. Since two air gaps are proivded in the magnetic circuit, the rate of change of flux in the circuit upon upward movement of the punch pin 201d, is quite large and consequently the voltage produced in the coil 464 is more than ample for use with relatively insensitive circuits. In spite of the very small size of the coils, voltages of 100 millivolts may be generated. Lead wires from the coil 464 are brought out to separate verification circuits there being an output circuit for each of the 48 coils employed in the apparatus.

The punch pin 201d has been cut away to show the comb structure and punch pin arrangement for sensing movement of the punch pin 201b. Between the fingers 454 and 457, and contiguous to the finger 457, is a further magnetic finger 466. This finger has a double right angle bend which is a mirror image of the double right angle bend formed in the finger 459, so that the finger projects outwardly from the magnetic structure immediately adjacent the upper edge of the channel formed in the permanent magnet 454. A projection 467 is formed on the right or rear surface, as viewed in FIGURE 11 of the punch pin 201b. The projection lies below the end of the finger 466, so as to provide an air gap therebetween. A second projection 468 is formed on the pin 201b and is disposed opposite a finger 469 extending outwardly from the comb structure 453 and lying in the same plane as the base of the comb structure. Upon upward movement of the pin 201b, the projections 467 and 468 become aligned with the fingers 466 and 469, respectively, so as to greatly reduce the size of the air gaps in the circuit and produce a rapid increase in the flux density in the circuit. An electric coil, which is not illustrated, is disposed about the outwardly extending portion of the finger 466 to sense the rate of change in flux in the magnetic circuit. It will be noted that due to the use of the fingers having double right angle bends, first from the lower comb structure and then from the upper comb structure, the various projections on the pins are at different levels. More specifically the projections 458 and 463 on the pin 201d' are at a relatively large distance above the projections 467 and 468 on the pin 201b. As a result of this arrangement, the movement of the projections 467 and 468 on the pin 201b, do not affect the flux density in the magnetic circuit, including the fingers 457 and 462, which pass close to the rear or right vertical edge of the punch pin 201b. This is an essential feature of the apparatus employed to prevent cross-talk between the various magnetic circuits. This structural arrangement also provides for both longitudinal and vertical staggering of the pick-up coils so as to maximize the coil size in the limited available space. To prevent flux from the magnetic circuit formed by the fingers pairs from being coupled through adjacent punch pins, the air gaps between the fingers and the punch pins is made large in comparison to the air gap between the fingers and the extensions of an actuated punch pin.

The next finger in the array which is a part of the structure 452 is not illustrated, but is of the type of finger 466 and is employed to sense the position of the punch pin 201b'. Correspondingly the next finger in the array of the comb 453 is of the type of the finger 469 to sense the lower projection on the pin 201b'. The structure of the combs, coils and pins is completely repetitively until 24 such structures are provided in order to sense the 24 punch pins lying in the left half of the apparatus. A generally U shaped sheet metal plate 471 is secured to the back and sides of the magnet as viewed in FIGURE 5 to provide mounting lugs 472 and 473 on opposite ends of the structure. These lugs are bolted to the bail support structure, illustrated in FIGURE 10, at the upper two holes 474, on the leg 401 and the holes 476 on the leg 404 of the bail structure. The verification structure on the right side of the apparatus, as illustrated in FIGURE 5, is identical to that on the left side but is rotated about the vertical center line of the apparatus, as illustrated in FIGURE 5. Thus, the extensions on the punch pin 201a correspond to the extension on the pin 201b, but are directed in the same direction as the extensions such as 456 on the pin 201b. Also, therefore, the left, lower finger on the right structure lies in the plane of its base member and the left, upper finger on the uppermost structure has the double right angle bend. Other than the fact that the structure on the right is rotated about the vertical center line of the apparatus with respect to the left hand structure the structures are identical.

In order to complete the apparatus directly related to the punch pins, and reference is again made to FIGURES 5 and 10 of the accompanying drawings, the punch main plate and guide block 250 is secured to the top of the four post 401 through 404 of FIGURE 10. The plate 250 has formed therein 48 rectangular apertures aligned with the 48 rectangular apertures in the cross member of the upper bail portion 217. Cards to be punched pass over the top of the plate 250 being held against the plate by a conventional die block or plate into which the selected punch pins are driven and which is not illustrated since the arrangement between this plate and the plate 250 is completely conventional. Further, it should be emphasized that the ends of the punch pins could be made either cylindrical for punching round holes, or rectangular for punching rectangular holes. In either event, a stop plate 475 must be provided to prevent the punch pins from falling so low that they block the interposers 202 in the out or reset position. The stop plate 475 is seated in a recess in the bottom of plate 250 and includes a plurality of fingers 480 disposed in a notch 485 formed in each punch pin. The upper surfaces of the notches seat on the fingers 480 and limit downward movement of the pins.

Referring now specifically to FIGURE 12 of the accompanying drawings, the oil pump arrangement employed for lubricating the apparatus of the present invention is illustrated. A sufficient portion of the bail 203 and bail support structure of FIGURE 10 is included in this figure to orient the new structures with the remainder of the apparatus. The main drive shaft 247 extends outwardly from the boss 417, being supported therein by means of a bearing 501. Disposed between the bearing 501 and the main shaft 247 is a hub 502 of a gear 503, which is secured to the shaft 247 for rotation therewith. The gear 503 drives a pinion 504, supported on a shaft 506. The shaft 506 is carried by a member, generally designated by the numeral 507, which is illustrated also in FIGURE 13 of the accompanying drawings. The member 507 has a generally rectangular surface 508, which extends to the right as illustrated in FIGURE 12. This rectangular surface 508 is inserted between the guide plates 408 and 409, which are disposed between the vertical members 401 and 402 of the bail support. The right hand surface of the extension 508 provides the end thrust bearing support for the main bail 203 at the left or forward side of the bail support, as illustrated in FIGURE 10 of the accompanying drawings.

The member 507 is provided with left and right flanges 509 and 511, illustrated in FIGURE 13, which are adapted to be bolted to the arms 401 and 402 of the bail support in FIGURE 10. Secured to the left end, as viewed in FIGURE 12, of the shaft 506, is a vertical cross member 512, of a centrifugal oil pump, generally designated by the reference numeral 513. The oil pump 513 is formed as a surface revolution about the axis of the shaft 506, and is defined by a generally funnel-shaped circular wall 514. The wall 512 is located internally of the funnel-shaped outer member 514, lying in a plane perpendicular to the axis of the member 514. The left end of the funnel shaped member 514, as viewed in FIGURE 12 (this being the lower end of the apparatus as actually employed), is located in an oil sump 516, having an oil level therein, as defined by the dashed line 517. The left end of the member 514 is open so that oil may enter this region. A permanent magnet 518 is disposed in the sump 516, and is employed to attract and hold metallic waste which may accumulate in the oil. The funnel shape member 514 is rotated at a very high rate, via the gear 503 and pinion 504 and due to centrifugal force, oil is moved upwardly, that is to the right, as viewed in FIGURE 12. The plate 512 is a solid member having a series of holes 519 formed therein to permit passage of oil from the sump region into the region to the right, that is above the plate 512. It will be noted that these holes are located inwardly from the outer funnel-shaped wall 514, the holes being spaced about a quarter to one half inch apart about the disc 512. The reason for spacing the holes 519 away from the outer wall is to cause the heavier elements in the oil, which normally constitute dirt and other unwanted accumulations, to be trapped between the outer wall 514 and the portions of the plate 512 which lie between the outer wall and the holes 519. The wall of the funnel-shaped member 514 lying to the right of the plate 514 as viewed in FIGURE 12, has an outward flare which imparts a velocity to the oil of such a rate that upon leaving the right hand edge of this member, the oil is atomized and is thrown in mist form upwardly through the entire operating mechanism, thereby providing complete lubrication of all moving parts in the mechanism. Return of the oil to sump 516 is affected by gravity feed, since as emphasized numerous times, the devices is arranged with the sump 516 at the lowest part of the apparatus. Although an oil mist lubrication system has been described here, with a configuration which requires that shaft 247 be vertical, other oil pumps are in common use which would permit operation of the punch 3 in card handling applications where the shaft 247 must be horizontal.

In operation of the punch device of the present invention and during any cycle of operation, the interposer return bail 222 rises almost in unison with the punch bail as it rises as though executing a record marking operation. The reset bail then becomes stationary while the selected punch pins are withdrawn from the die plate. The downward stroke of the punch bail 203 acting against the stationary reset bail 222 returns all interposers to their unactivated positions with their ends 221 disposed adjacent the poles 234 of the electromagnets 229. The coils 229 associated with the punch pins 201 which are to remain inactive during the next punch cycle are energized and their associated interposers 202 are held out. Upon withdrawal of the bail 222, the remaining interposers are moved by their springs 207 to their innermost positions, as determined by the geometry of the gap 204 and the interposers 202, so that their upward extensions 211 are disposed under selected punch pins or extensions 216 of selected punch pins 201. The punch bail 203 together with the reset bail 222 is now moved upwardly carrying all of the interposers 202 with them. The portions 211 of the selected interposers engage associated portions of the selected punch pins and carry them upwardly therewith. The unselected punch pins are not engaged by any portion of an unselected interposer and hence are not driven by the punch bail. When the punch bail 203 has attained maximum height, the punch pins have achieved maximum penetration. Further, the correctness of punching has been checked by the variable reluctance magnetic circuits described in FIGURE 11. As the drive shaft continues to rotate, the punch bail 203 is now retracted, under the force of springs 252 and 253 and the upper bail member 217 engages shoulders 219 on the actuated pins 201, positively extracting the pins from the punched member. The cycle is now complete and the next cycle may start.

It should be mentioned that record members, or cards, are only delivered to the punch head 3 when the associated drive motor is rotating the punch drive shaft at a speed near its normal speed and the associated magnet control circuits are operating.

Although a mechanism capable of punching rectangular holes in 4 columns during each punch cycle is illustrated, the principles described apply equally to a device capable of recording either in fewer than 4 columns, or more than 4 columns with recorded holes either circular, rectangular, or any other desired shape.

As previously indicated, three punch-reset cycles are effected for each revolution of the shaft 247, with each cycle occupying 120° mechanical degrees of the drive shaft's rotation. Since punching of 720 columns per second is desired and 4 columns are punched during each punching cycle in the embodiment described, the shaft 247 need be rotated at but 3600 r.p.m.

While we have described and illustrated on specific embodiment of our invention, it will be clear that variations of the details of construction which are specifically illustrated and described may be resorted to without departing from the true spirit and scope of the invention as defined in the appended claims.

What is claimed is:

1. A punch mechanism comprising a plurality of reciprocable punch pins, a punch bail, means for reciprocating said punch bail toward and away from said punch pins to establish a punch cycle a plurality of interposers completely supported by said punch bail and reciprocable therewith toward and away from said punch pins, each of said interposers being movable relative to said punch bail between an actuated and an unactuated position, a plurality of control means for controlling the movement of said interposers into an actuated position, each of said interposers having a raised portion formed thereon which is disposed between said punch bail and a punch pin only when said interposer is in its actuated position, said raised portion being of such a dimension as to engage and move said punch pin to a punching position upon movement of said punch bail toward said punch pins, means for moving all of said interposers to their unactivated position, and means for maintaining selected interposers in an unactuated position during a punch cycle.

2. The combination according to claim 1 wherein said means for moving said interposers comprises an interposer return bail, and means for reciprocating said interposer return bail toward and away from said interposer in timed relationship to the cycle of reciprocating of said punch bail, and means secured to said interposers adapted to be engaged by said interposed return bail and move said interposers to their unactuated position.

3. The combination according to claim 2 wherein said punch bail includes means for supporting said restorer bail.

4. The combination according to claim 1 wherein said means for maintaining comprises a distinct electromagnet for each of said interposers, an electromagnetic being energized to maintain an interposer in its unactuated position.

5. The combination according to claim 4 wherein each of said interposers includes one end capable of supporting magnetic flux remote from said punch bail, each of said ends being included in the magnetic flux path of a different one of said electromagnets when said interposer is in its unactuated position.

6. The combination according to claim 5 wherein said ends of alternate ones of said interposers extend outwardly from different sides of said punch bail and wherein said restorer bail urges each interposer in the direction of its said end.

7. The combination according to claim 1 further comprising pump means for bathing said bails, said interposers and said punch pins adjacent said bails and interposers in an oil mist.

8. The combination according to claim 7 wherein said pump means comprises a cup with outwardly diverging walls, and means for rotating such cup with one end in oil and at a velocity such that the centrifugal force imparted to the oil is greater than its surface tension and the oil atomizes.

9. The combination according to claim 8 further comprising a wall dividing said cup into two regions between its ends and a plurality of holes formed in said wall inwardly from its periphery.

10. The combination according to claim 1 wherein said control means has no mechanical connection to said interposers.

11. A punch mechanism comprising a plurality of reciprocable punch pins, a punch bail, means for reciprocating said punch bail toward and away from said punch pins to establish a punch cycle, a plurality of interposers supported on said punch bail and reciprocable therewith toward and away from said punch pins, each of said interposers being movable relative to said punch bail between an actuated and an unactuated position, each of said interposers having a raised portion formed thereon which is disposed between said punch bail and a punch pin only when said interposer is in its actuated position, said raised portion being of such a dimension as to engage and move said punch pin to a punching position upon movement of said punch bail toward said punch pins, means for moving all of said interposers to their unactivated position upon withdrawal of said punch bail, and means, including a distinct electromagnet for each of said interposers, for maintaining selected interposers in an unactuated position during a punch cycle, each of said interposers including one end capable of supporting magnetic flux and being included in the magnetic flux path of a different one of said electromagnets when said interposer is in its unactuated position, said ends of alternate ones of said interposers extending outwardly from different sides of said punch bail such that said restorer bail urges each interposer in the direction of its said end; guide means for said interposers, said guide means including a pair of gull-wing-like structures each disposed on opposite sides of said punch bail, each of said structures having a plurality of parallel slots extending through the center section thereof, both ends of each of said interposers extending through opposed slots in said structures.

12. The combination according to claim 11 wherein said slots are of sufficient length to permit said interposers to move with said punch bail through its total stroke.

13. A punch mechanism comprising a plurality of reciprocable punch pins, a punch bail, means for reciprocating said punch bail toward and away from said punch pins to establish a punch cycle, a plurality of interposers supported on said punch bail and reciprocable therewith toward and away from said punch pins, each of said interposers being movable relative to said punch bail between an actuated and an unactuated position, each of said interposers having a raised portion formed thereon which is disposed between said punch bail and a punch pin only when said interposer is in its actuated position, said raised portion being of such a dimension as to engage and move said punch pin to a punching position upon movement of said punch bail toward said punch pins, means including an interposer return bail for moving all of said interposers to their unactivated position upon withdrawal of said punch bail, means for reciprocating said interposer return bail toward and away from said interposer in timed relationship to the cycle of reciprocation of said punch bail, means secured to said interposers adapted to be engaged by said interposer return bail to move said interposers to their unactuated position, and means for maintaining selected interposers in an actuated position upon withdrawal of said punch bail; and further comprising a rotatable shaft, punch bail cams and restorer bail cams mounted on said shaft, first counterbalancing means for said restorer bail, second counterbalancing means for said punch bail, means for driving said first counterbalancing means from said punch bail cams and means for driving said second counterbalance means from said restorer bail cams.

14. A punch mechanism comprising a plurality of reciprocable punch pins, a punch bail, means for reciprocating said punch bail toward and away from said punch pins to establish a punch cycle, a plurality of interposers supported on said punch bail and reciprocable therewith toward and away from said punch pins, each of said interposers being movable relative to said punch bail between an actuated and an unactuated position, each of said interposers having a raised portion formed thereon which is disposed between said punch bail and a punch pin only when said interposer is in its actuated position, said raised portion being of such a dimension as to engage and move said punch pin to a punching position upon movement of said punch bail toward said punch pins, means for moving all of said interposers to their unactivated position upon withdrawal of said punch bail, and means for maintaining selected interposers in an unactuated position during a punch cycle; a pair of spaced lugs formed on each of said punch pins, a distinct variable reluctance sensing circuit for each of said punch pins, each of said sensing circuits including an air gap when its associated punch pin is in its unactuated position, said lugs closing said air gap from both ends thereof as said punch pin is moved into its punching position.

15. A punch mechanism comprising a plurality of reciprocable punch pins, a punch bail, means for reciprocating said punch bail toward and away from said punch pins to establish a punch cycle, a plurality of interposers supported on said punch bail and reciprocable therewith toward and away from said punch pins, each of said interposers being movable relative to said punch bail between an actuated and an unactuated position, each of said interposers having a raised portion formed thereon which is disposed between said punch bail and a punch pin only when said interposer is in its actuated position, said raised portion being of such a dimension as to engage and move said punch pin to a punching position upon movement of said punch bail toward said punch pins, means for moving all of said interposers to their unactivated position upon withdrawal of said punch bail, and means for maintaining selected interposers in an unactuated position during a punch cycle; said punch pins being arranged in four columns of "$n$" rows each with "$n$" being equal to the number of rows of information areas to be inscribed on a recording medium, said columns of punch pins extending parallel to the sides of maximum length of said punch bail, the punch pins in two of said columns being selected by interposers having their raised portions moved toward one side of said punch bail during actuation thereof and the punch pins of the other two of said four columns of punch pins being selected by interposers having their raised portions moved toward the other side of said punch bail.

16. The combination according to claim 15 further comprising a pair of spaced lugs formed on each of said punch pins, a distinct variable reluctance sensing circuit for each of said punch pins, each of said sensing circuits including an air gap when its associated punch pin is in its unactuated position, said lugs closing said air gap from both ends thereof as said punch pin is moved into its punching position.

17. The combination according to claim 16 wherein said lugs extend parallel to said sides of said punch bail and wherein punch pins in adjacent columns have their lugs formed on opposite surfaces thereof and punch pins in the same column have their lugs formed on corresponding surfaces thereof.

18. The combination according to claim 17 wherein said lugs on punch pins in one column are disposed at different levels relative to said punch bail from the lugs on the punch pins in the adjacent columns, and wherein said variable reluctance sensing circuits are divided into two groups of sensing circuits each located adjacent a different side of said punch bail, each of said groups comprising a magnet, a first and a second comb each disposed along a different side of said magnet and extending generally parallel to said columns of said punch pins, each of said combs having all fingers extending toward said punch pins with every other finger disposed adjacent a lug on a punch pin in one of said columns and each intermediate finger being disposed opposite a lug on a punch pin in an adjacent column, a finger on each of said combs being aligned with a finger of the other of said combs along the direction of movement of each of said punch pins so as to provide a plurality of magnetic circuits each comprising said magnet, the bases of said combs, a pair of aligned fingers of said combs and an associated punch pin, and a plurality of electrical coils, each coil being disposed about a finger associated with a different one of said magnetic circuits.

19. A punch mechanism comprising a plurality of reciprocable punch pins, a punch bail, means for reciprocating said punch bail toward and away from said punch pins to establish a punch cycle, a plurality of interposers supported on said punch bail and reciprocable therewith toward and away from said punch pins, each of said interposers being movable relative to said punch bail between an actuated and an unactuated position, each of said interposers having a raised portion formed thereon which is disposed between said punch bail and a punch pin only when said interposer is in its actuated position, said raised portion being of such a dimension as to engage and move said punch pin to a punching position upon movement of said punch bail toward said punch pins, means for moving all of said interposers to their unactivated position upon withdrawal of said punch bail, and means for maintaining selected interposers in an unactuated position during a punch cycle, pump means for bathing said bails, said interposers and said punch pins adjacent said bails and interposers in an oil mist, wherein said pump means comprises a cup with outwardly diverging walls, and means for rotating such cup with one end in oil and at a velocity such that the centrifugal force imparted to the oil is greater than its surface tension and the oil atomizes.

20. A punch mechanism comprising a plurality of reciprocable punch pins movable between a rest and a punching position, a punch bail, means for reciprocating said punch bail toward and away from said punch pins to establish a punch cycle, a plurality of interposers solely supported by said punch bail and reciprocable therewith, each of said interposers being movable relative to said punch bail between a first position and a second position, a plurality of control means for maintaining selected ones of said interposers in said first position, each of said interposers having a surface portion which when said interposer is in one of said positions only is adapted to engage and move one of said punch pins to a punching position upon movement of said punch bail toward said punch pins, said punch bail including means, independent of said interposers, for returning said punch pins from their punching position to their rest position during movement of said punch bail away from said punch pins and means for moving said interposers between said first and second positions.

21. The combination according to claim 20 wherein said punch pins are arranged in a given number of columns of "$n$" rows each with "$n$" being equal to the number of rows of information areas to be inscribed on a recording medium, said columns of punch pins extending parallel to the sides of maximum length of said punch bail, the punch pins in half of said columns being selected by interposers having their raised portions moved toward one side of said punch bail during actuation thereof and the punch pins of the other half of said given number of columns of punch pins being selected by interposers having their raised portions moved toward the other side of said punch bail.

22. The combination of claim 20 wherein said given surface portion of each of said interposers comprises a raised portion of a predetermined dimension.

23. The combination of claim 22 wherein at least two of said plurality of interposers have their respective raised portions of predetermined dimension of unequal magnitude.

24. The combination of claim 22 wherein said control means comprises a distinct electromagnet for each of said interposers, said electromagnet being energized in one of said first and second positions.

25. The combination according to claim 24 wherein each of said interposers includes a region capable of supporting magnetic flux, each of said regions being included in the magnetic flux path of a different one of said electromagnets when said interposer is in one of said positions.

26. The combination according to claim 25 wherein said regions of said interposers extend outwardly from different sides of said punch bail.

27. The combination according to claim 25 further comprising guide means for said interposers, said guide means including a pair of gull-wing-like structures each disposed on opposite sides of said punch bail, each of said structures having a plurality of parallel slots corresponding to the plurality of interposers, each of said regions of said interposers extending through opposed slots in said members, the wing portions of each of said gull-wing-like structures supporting the center pole pieces of said electromagnets, each magnetic circuit including one of said wing portions.

28. The combination according to claim 27 wherein said regions of said interposers extend in a direction opposite to said punch pins for a sufficient distance such that said electromagnets are energized only when said interposers are in said magnetic circuit.

29. The combination according to claim 20 further comprising guide means for said interposers, said guide means including a pair of structural members each disposed on opposite sides of said punch bail, each of said members having a plurality of parallel slots corresponding to the plurality of interposers each of said interposers having an end region which extends through opposed slots in said members.

30. The combination according to claim 29 wherein each of said members comprises a gull-wing-like structure wherein the center section thereof includes said plurality of parallel slots.

31. The combination according to claim 30 wherein said slots are of sufficient length to permit said interposers to move with said punch bail through its total stroke.

References Cited by the Examiner

UNITED STATES PATENTS

| | | | |
|---|---|---|---|
| 2,962,208 | 11/1960 | MacNeill et al. | 234—131 X |
| 2,989,229 | 6/1961 | Barbeau | 234—115 |
| 3,018,037 | 1/1962 | Stemme | 234—119 |
| 3,051,377 | 8/1962 | Bradbury | 234—115 |
| 3,133,698 | 5/1964 | Hergert | 234—115 |
| 3,159,337 | 12/1964 | MacNeill et al. | 234—33 |

OTHER REFERENCES

IBM Technical Disclosure Bulletin, vol. 3, No. 3, August 1960, Stanton et al.

WILLIAM W. DYER, JR., *Primary Examiner.*

WILLIAM S. LAWSON, *Examiner.*